US008732333B2

(12) United States Patent
Maki (10) Patent No.: US 8,732,333 B2
(45) Date of Patent: May 20, 2014

(54) FACSIMILE COMMUNICATION SYSTEM, FACSIMILE APPARATUS, FACSIMILE COMMUNICATION METHOD, TRANSMISSION PROCESSING METHOD, AND RECEPTION PROCESSING METHOD

(75) Inventor: Nobuhiko Maki, Tokyo (JP)

(73) Assignee: Canon Kabushiki Kaisha (JP)

( * ) Notice: Subject to any disclaimer, the term of this patent is extended or adjusted under 35 U.S.C. 154(b) by 1354 days.

(21) Appl. No.: 12/026,889

(22) Filed: Feb. 6, 2008

(65) Prior Publication Data

US 2010/0027793 A1 Feb. 4, 2010

(30) Foreign Application Priority Data

Feb. 8, 2007 (JP) .................................. 2007-029507

(51) Int. Cl.
*G06F 15/16* (2006.01)
*G06F 15/173* (2006.01)
*H04L 29/06* (2006.01)
*H04N 1/44* (2006.01)
*H04L 29/12* (2006.01)

(52) U.S. Cl.
CPC ....... *H04L 29/06197* (2013.01); *H04L 61/2564* (2013.01); *H04L 29/06326* (2013.01); *H04L 61/1529* (2013.01)
USPC ........... 709/238; 709/227; 709/228; 380/243; 713/151

(58) Field of Classification Search
CPC ..................... H04L 29/06027; H04L 65/1069; H04L 65/1006; H04L 63/0428; H04L 29/06326; H04L 29/06197
USPC .................. 358/400, 402, 407, 409; 380/243; 709/227, 228, 238; 713/151
See application file for complete search history.

(56) References Cited

U.S. PATENT DOCUMENTS

| 6,775,711 | B1 * | 8/2004 | Akimoto | 709/245 |
|---|---|---|---|---|
| 7,480,254 | B2 * | 1/2009 | Mayer | 370/254 |
| 7,512,791 | B1 * | 3/2009 | Sato | 713/166 |
| 8,037,138 | B2 * | 10/2011 | Izumi | 709/206 |
| 2002/0039419 | A1 * | 4/2002 | Akimoto et al. | 380/243 |
| 2002/0124167 | A1 * | 9/2002 | Toyota et al. | 713/150 |
| 2004/0057568 | A1 * | 3/2004 | Kawabata et al. | 379/220.01 |
| 2004/0243680 | A1 * | 12/2004 | Mayer | 709/206 |
| 2006/0018472 | A1 * | 1/2006 | Tanimoto | 380/243 |
| 2006/0053278 | A1 * | 3/2006 | Tanimoto et al. | 713/150 |
| 2006/0184676 | A1 * | 8/2006 | Tanimoto | 709/227 |
| 2007/0071002 | A1 * | 3/2007 | Jepson et al. | 370/389 |
| 2007/0229910 | A1 * | 10/2007 | Ulybin | 358/405 |
| 2008/0259385 | A1 * | 10/2008 | Uruma | 358/1.15 |

FOREIGN PATENT DOCUMENTS

JP 2002-232722 A 8/2002

* cited by examiner

*Primary Examiner* — Tae Kim
(74) *Attorney, Agent, or Firm* — Rossi, Kimms & McDowell LLP

(57) ABSTRACT

A facsimile communication system which is capable of selectively performing encrypted communication or non-encrypt communication according to the intention of a user. A transmitting-side digital multifunction machine inputs the port address of a receiving-side digital multifunction machine according to a user operation, and designates encrypted communication for transmitting IFP packets of image information, via an IP network, after encrypting the IFP packets, or non-encrypt communication for transmitting IFP packets of image information, via the IP network, without encrypting the IFP packets. The receiving-side digital multifunction machine determines whether the input port address is for an encrypted communication port or a non-encrypt communication port, and sends a response containing an associated port number to the transmitting-side digital multifunction machine. The transmitting-side digital facsimile apparatus establishes connection to the port with the port number, and performs the designated communication.

4 Claims, 4 Drawing Sheets

FACSIMILE COMMUNICATION SYSTEM, FACSIMILE APPARATUS, FACSIMILE COMMUNICATION METHOD, TRANSMISSION PROCESSING METHOD, AND RECEPTION PROCESSING METHOD

BACKGROUND OF THE INVENTION

1. Field of the Invention

The present invention relates to a facsimile communication system for performing facsimile communication via an IP network, a facsimile apparatus, a facsimile communication method, a transmission processing method, and a reception processing method.

2. Description of the Related Art

Recently, in many cases, the communication method has been shifting toward a method utilizing an IP (Internet Protocol) as the common basis, i.e. a method of performing communication via the Internet or an intranet, using the IP.

Further, in the IP communication, data transmitted over an IP network is always in danger of being illegally viewed or tampered with. To protect data from the danger, a recent trend is to introduce encryption means using IPsec (Internet Protocol Security) which performs encryption and authentication of IP packets (see a relevant RFC).

The IPsec incorporates a key exchange function, an authentication function, and an encryption function. The key exchange function is to safely exchange information on keys necessary for authentication or encryption. The authentication function is to perform authentication of a sender of IP packets by adding a header called an AH (Authentication Header) to the IP packets to thereby prevent a malicious third party pretending to be the authorized user from sending unauthorized packets. The encryption function is to add a header called an ESP (Encapsulating Security Payload) to each IP packet to thereby encrypt the entire packet including the ESP header or only the payload of the packet. Encryption of the entire packet is called the "tunneling mode", and encryption of only the payload as "transport mode".

Communication using an IP has the advantage of enabling high-speed communication and reducing communication charge. Therefore, the IP communication is employed for facsimile communication, and facsimile communication using an IP (hereinafter referred to as "IP-FAX communication") is specified in ITU-T recommendation T.38. In IP-FAX communication, as in G3 FAX communication, data is directly transmitted to a receiving end in a state communicatively connected to the receiving end (real-time communication). In this IP-FAX communication as well, data is in danger of being illegally viewed, leaked, or tampered with.

To solve this problem, there has been proposed a facsimile apparatus that performs encrypted communication only on a communication network (the Internet) (see Japanese Laid-Open Patent Publication (Kokai) No. 2002-232722). In a case where this facsimile apparatus is used for communication, first, negotiation is done between an apparatus at a transmitting end and an apparatus at a receiving end to make a decision as to whether to perform encrypted communication or non-encrypt communication. If encrypted communication is determined to be used by the negotiation, the transmitting-end apparatus encrypts data to be transmitted, by a predetermined encryption system. Then, the encrypted data is transmitted to the receiving-end apparatus via a communication network in accordance with ITU-T recommendation T.38.

On the other hand, if non-encrypt communication is selected, the transmitting-end apparatus transmits the data to the receiving-end apparatus without encrypting the same.

For example, when the data to be transmitted has high confidentiality, the transmitting-end user prefers encrypted communication. However, if the receiving-end apparatus does not support encrypted communication, the transmitting-end user and the receiving-end user decides to perform non-encrypt communication through negotiation. In this case, the data having high confidentiality is transmitted by non-encrypt communication without being encrypted, against the intention of the user who prefers encrypted communication. Therefore, there is a demand for a facsimile apparatus which is capable of selectively performing one of encrypted communication and non-encrypt communication with reliability.

SUMMARY OF THE INVENTION

The present invention provides to a facsimile communication system and a facsimile apparatus, which are capable of selectively performing one of encrypted communication and non-encrypt communication according to users' intention, a facsimile communication method therefor, as well as a transmission processing method and a reception processing method.

In a first aspect of the present invention, there is provided facsimile communication system comprising a transmitting-side facsimile apparatus configured to perform facsimile transmission via an IP network, the transmitting-side facsimile apparatus including a transmitter unit configured to be capable of selectively performing encrypted communication for transmitting IFP packets of image information, via the IP network, after encrypting the IFP packets, or non-encrypt communication for transmitting IFP packets of image information, via the IP network, without encrypting the IFP packets, a destination information input unit configured to input destination information for the facsimile transmission according to a user operation, and a designating unit configured to designate one of the encrypted communication and the non-encrypt communication as a communication for the facsimile transmission, according to the user operation, and a receiving-side facsimile apparatus configured to perform facsimile reception in response to the facsimile transmission performed via the IP network, the receiving-side facsimile apparatus including an encrypted communication port assigned encrypted communication destination information and configured to receive encrypted IFP packets, a non-encrypt communication port assigned non-encrypt communication destination information and configured to receive unencrypted IFP packets, a determination unit configured to be operable when a call connection is made by the transmitting-side facsimile apparatus using the input destination information, to determine a port assigned the input destination information, and a notification unit configured to notify the transmitting-side facsimile apparatus of the determined port, wherein the transmitter unit of the transmitting-side facsimile apparatus establishes connection to the port whose information was sent from the receiving-side facsimile apparatus during the call connection to the receiving-side facsimile apparatus, and performs the designated communication.

With the configuration of the first aspect of the present invention, it is possible to selectively perform one of encrypted communication and non-encrypt communication according to the users' intention.

In a second aspect of the present invention, there is provided a facsimile apparatus which is capable of performing facsimile communication, via an IP network, with a receiving-side facsimile apparatus having an encrypted communication port assigned encrypted communication destination information and a non-encrypt communication port assigned non-encrypt communication destination information, comprising a transmitter unit configured to be capable of performing encrypted communication for transmitting IFP packets of image information, via the IP network, after encrypting the IFP packets, and non-encrypt communication for transmitting IFP packets of image information, via the IP network, without encrypting the IFP packets, a destination information input unit configured to input destination information for the facsimile transmission according to a user operation, and a designating unit configured to designate one of the encrypted communication and the non-encrypt communication according to the user operation, wherein the transmitter unit establishes connection to the port whose information was sent from the receiving-side facsimile apparatus during a call connection to the receiving-side facsimile apparatus, and performs the designated communication.

When the input destination information is the encrypted communication destination information of the receiving-side facsimile apparatus, and at the same time, when the encrypted communication is designated, the transmitter unit can be notified of the encrypted communication port by the receiving-side facsimile apparatus, and establish connection to the encrypted communication port to perform the encrypted communication, and when the input destination information is the non-encrypt communication destination information of the receiving-side facsimile apparatus, and at the same time, when the non-encrypt communication is designated, the transmitter unit can be notified of the non-encrypt communication port by the receiving-side facsimile apparatus, and establish connection to the non-encrypt communication port to perform the non-encrypt communication.

The encrypted communication port of the receiving-side facsimile apparatus is configured to ignore reception of the unencrypted IFP packets, and the non-encrypt communication port of the receiving-side facsimile apparatus is configured to ignore reception of the encrypted IFP packets, and when the input destination information is the non-encrypt communication destination information of the receiving-side facsimile apparatus, and at the same time, when the encrypted communication is designated, the transmitter unit can be notified by the receiving-side facsimile apparatus of the non-encrypt communication port assigned the input destination information, and after establishing connection to the non-encrypt communication port to start the encrypted communication, disconnect a call to the receiving-side facsimile apparatus, and when the input destination information is the encrypted communication destination information of the receiving-side facsimile apparatus, and at the same time, when the non-encrypt communication is designated, the transmitter unit can be notified by the receiving-side facsimile apparatus of the encrypted communication port assigned the input destination information, and after establishing connection to the encrypted communication port to start the non-encrypt communication, disconnect a call to the receiving-side facsimile apparatus.

The facsimile apparatus comprises a receiver unit having an encrypted communication port configured to receive encrypted IFP packets, and a non-encrypt communication port configured to receive unencrypted IFP packets.

In a third aspect of the present invention, there is provided a facsimile apparatus which is capable of performing facsimile communication, via an IP network, with a transmitting-side facsimile apparatus which is capable of performing encrypted communication for transmitting IFP packets of image information after encrypting the IFP packets, and non-encrypt communication for transmitting IFP packets of image information without encrypting the IFP packets, comprising an encrypted communication port assigned encrypted communication destination information and configured to receive encrypted IFP packets, a non-encrypt communication port assigned non-encrypt communication destination information and configured to receive unencrypted IFP packets, a determination unit configured to be operable when a call connection is made by the transmitting-side facsimile apparatus using the input destination information, to determine a port assigned the input destination information, and a notification unit configured to notify the transmitting-side facsimile apparatus of the determined port.

The encrypted communication port of the facsimile apparatus is configured to ignore reception of the unencrypted IFP packets, and the non-encrypt communication port is configured to ignore reception of the encrypted IFP packets.

The facsimile apparatus comprises a configuration unit configured to changeably set the encrypted communication destination information assigned to the encrypted communication port and the non-encrypt communication destination information assigned to the non-encrypt communication port.

In a fourth aspect of the present invention, there is provided a facsimile communication method for facsimile communication performed between a transmitting-side facsimile apparatus and a receiving-side facsimile apparatus via an IP network, wherein the transmitting-side facsimile apparatus performs input of destination information of the receiving-side facsimile apparatus, according to a user operation, and designates one of encrypted communication for transmitting IFP packets of image information, via the IP network, after encrypting the IFP packets and non-encrypt communication for transmitting IFP packets of image information, via the IP network, without encrypting the IFP packets, according to a user operation, and when a call connection is made by the transmitting-side facsimile apparatus using the input destination information, the receiving-side facsimile apparatus determines whether the destination information is encrypted communication destination information assigned to an encrypted communication port or non-encrypt communication destination information assigned to a non-encrypt communication port, and then notifies the transmitting-side facsimile apparatus of the port to which the destination information is determined by the determination unit to be assigned, and wherein the transmitting-side facsimile apparatus establishes connection to the port whose information was sent from the receiving-side facsimile apparatus, and performs the designated communication, and the receiving-side facsimile apparatus receives, via the port of which the receiving-side facsimile apparatus notifies the transmitting-side facsimile apparatus, IFP packets transmitted from the transmitting-side facsimile apparatus by the designated communication.

In a fifth aspect of the present invention, there is provided a transmission method for a facsimile apparatus which is capable of performing facsimile communication, via an IP network, with a receiving-side facsimile apparatus having an encrypted communication port assigned encrypted communication destination information and a non-encrypt communication port assigned non-encrypt communication destination information, comprising an input step of inputting destination information for designating which of encrypted communication and non-encrypt communication to be performed with the receiving-side facsimile apparatus, according to a user operation, a designation step of designating one of the encrypted communication for transmitting IFP packets of image information, via the IP network, after encrypting the IFP packets, and the non-encrypt communication for transmitting IFP packets of image information, via the IP network, without encrypting the IFP packets, and a transmission step of establishing connection to a port whose information was sent from the receiving-side facsimile apparatus during a call connection to the receiving-side facsimile apparatus, and performing the designated communication.

In a sixth aspect of the present invention, there is provided a reception method for a facsimile apparatus which is capable of performing facsimile communication, via an IP network, with a transmitting-side facsimile apparatus which is capable of performing encrypted communication for transmitting IFP packets of image information after encrypting the IFP packets, and non-encrypt communication for transmitting IFP packets of image information without encrypting the IFP packets, comprising a notification step of operating when a call connection is made by the transmitting-side facsimile apparatus using input destination information, to determine whether the destination information is encrypted communication destination information assigned to an encrypted communication port or non-encrypt communication destination information assigned to a non-encrypt communication port, and then notifying the transmitting-side facsimile apparatus of the port to which the destination information is determined to be assigned, and a reception step of receiving, via the port of which the facsimile apparatus notified the transmitting-side facsimile apparatus, IFP packets transmitted from the transmitting-side facsimile apparatus by the designated communication via the IP network.

The features and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
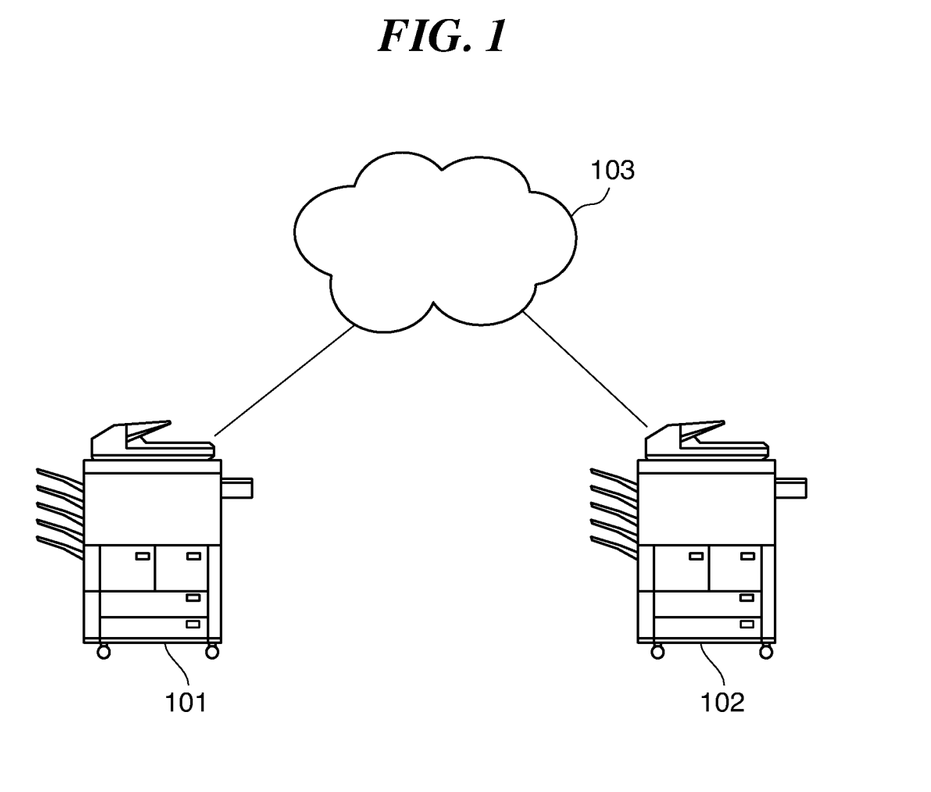
FIG. 1 is a schematic view of a facsimile communication system according to an embodiment of the present invention.

FIG. 1 is a schematic view of a facsimile communication system according to an embodiment of the present invention.

As shown in FIG. 1, the facsimile communication system includes an IP network 103, such as the Internet or an intranet. Connected to the IP network 103 are a plurality of digital multifunction machines 101 and 102 which are capable of selectively performing IP-FAX communication using IPsec (hereinafter referred to as "encrypted communication") or IP-FAX communication which does not use IPsec (hereinafter referred to as "non-encrypt communication").

The encrypted communication (IP-FAX communication using IPsec) means a facsimile communication in which authentication of a sender is performed using the IPsec functions of key exchange, authentication, and encryption, and IFP packets of an image read from an original, which are encrypted using IPsec, are transmitted and received. Now, it is assumed that encrypted communication is performed e.g. between the digital multifunction machine 101 at a transmitting end and the digital multifunction machine 102 at a receiving end.

In this case, the digital multifunction machine 101 (transmitting end) generates a facsimile signal (a procedure signal or encoded image data). The facsimile signal is converted into IFP (Internet Facsimile Protocol) packets. At the same time, the IFP packets are encrypted according to IPsec. Then, the encrypted IPF packets are sent from the digital multifunction machine 101 over the IP network 103.

Upon reception of the encrypted IPF packets, the digital multifunction machine 102 (receiving end) decrypts the encrypted IPF packets into non-encrypt. Then, the non-encrypt IFP packets are converted into the original facsimile signal, i.e. the encoded image data. Then, the encoded image data is decoded and printed out.

As described above, in encrypted communication, encrypted IFP packets are transmitted over the IP network 103. Therefore, encrypted communication makes it possible to prevent IFP packets (facsimile signal) from being illegally viewed or tampered with.

Figure 2:
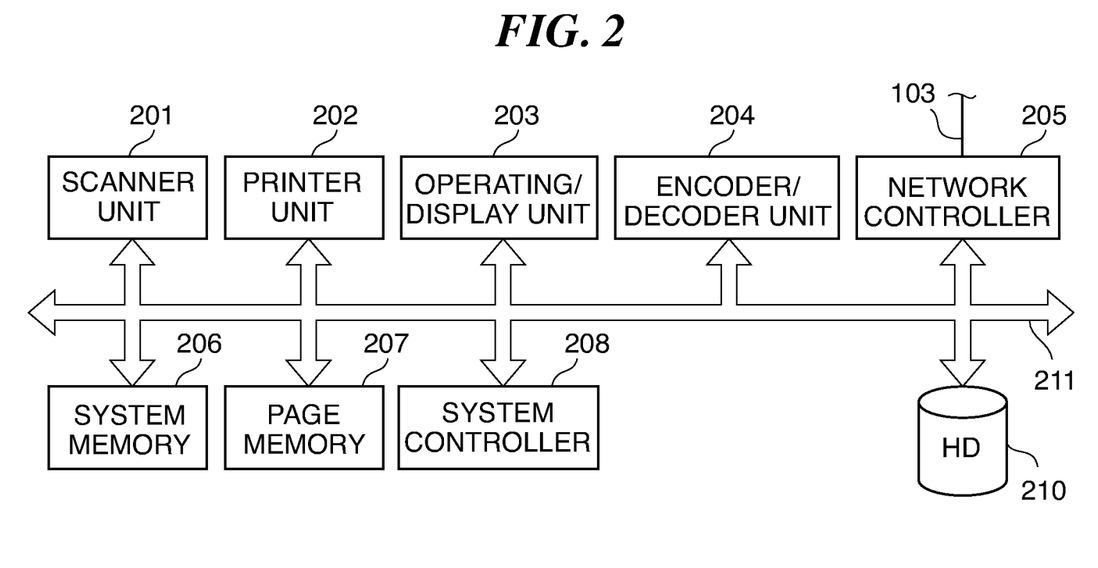
FIG. 2 is a block diagram of a digital multifunction machine appearing in FIG. 1.

Next, the configuration of the digital multifunction machine 101 (102) will be described with reference to FIG. 2. FIG. 2 is a block diagram of the digital multifunction machine 101 (102) appearing in FIG. 1.

As shown in FIG. 2, the digital multifunction machine 101 (102) includes a scanner unit 201, a printer unit 202, an operating display unit 203, an encoder/decoder unit 204, and a network controller 205. Further, the digital multifunction machine 101 (102) includes a system memory 206, a page memory 207, a system controller 208, and a hard disk (hereinafter referred to as "the HD") 210. These blocks 201 to 210 are connected to a system bus 211.

The scanner unit 201 reads an original in a designated reading mode (in which a sheet size, a resolution, a density, etc. are designated). The printer unit 202 prints an image on a sheet and delivers the sheet onto a stacking tray via a sheet discharge apparatus (not shown), such as a finisher. The operating display unit 203 includes an operation panel via which the user performs input operations for configuring various settings and a display panel which displays a set mode, details of the set mode, the operating state of the machine, and so forth.

The encoder/decoder unit 204 encodes image data read by the scanner unit 201, for facsimile communication, and decodes a received facsimile signal (encoded image data) into original image data.

The network controller 205 establishes connection to the IP network 103 to perform facsimile communication with another apparatus on the IP network 103. In the present embodiment, the non-encrypt communication (IP-FAX communication which does not use IPsec) and the encrypted communication (IP-FAX communication using IPsec) are selectively performed as facsimile communication. The network controller 205 has a non-encrypt communication port (not shown) and an encrypted communication port (not shown), and the ports are assigned respective different pieces of destination information. The non-encrypt communication port is configured to receive non-encrypt IFP packets (unencrypted IFP packets), and an encrypted IFP packet input to the non-encrypt communication port is ignored. The encrypted communication port is configured to receive encrypted IFP packets, and a non-encrypt IFP packet input to the encrypted communication port is ignored.

During non-encrypt communication, the destination information of an opposite communication party (receiving end) is input. The network controller 205 performs call setup to call the input destination information. Then, the network controller 205 establishes connection to the non-encrypt communication port notified by the opposite communication party in response to the call from the network controller 205, and performs image transmission. When the image transmission is completed, the network controller 205 performs call disconnection. During the communication, a facsimile signal including procedure signals and image signals is converted into IFP packets, and the IFP packets are transmitted over the IP network 103.

On the other hand, when IFP packets transmitted from an opposite communication party (transmitting end) by non-encrypt communication are received, the network controller 205 reconverts the received IFP packets into an original facsimile signal.

During encrypted communication, the destination information of an opposite communication party (receiving end) is input. The network controller 205 performs call setup to call the input destination information. Then, the network controller 205 establishes connection to the encrypted communication port notified by the opposite communication party in response to the call from the network controller 205, and performs image transmission. When the image transmission is completed, the network controller 205 performs call disconnection. During the communication, a facsimile signal including procedure signals and image signals is converted into IFP packets, and the IFP packets are transmitted over the IP network 103.

On the other hand, when encrypted IFP packets are received, the network controller 205 decrypts the encrypted IFP packets into non-encrypt IFP packets and further reconverts the non-encrypt IFP packets into an original facsimile signal.

As described above, encrypted communication is different from non-encrypt communication in that encrypted IFP packets are transmitted and received. Further, the encrypted communication port is used for encrypted communication, whereas the non-encrypt communication port is used for non-encrypt communication. It should be noted that encrypted communication and non-encrypt communication are identical in procedures, such as call setup, image transmission, and call disconnection.

The system memory 206 includes a ROM storing programs for controlling the machine and data required for control operations, and a RAM providing work areas for execution of control operations. The page memory 207 is used for loading one page of image data to be encoded or decoded. The system controller 208 includes a CPU (not shown) that controls the operations of the respective blocks 201 to 207, and 210 via the system bus 211 according to the programs stored in the system memory 206.

The HD 210 stores image data read by the scanner unit 201, encoded image data, decoded data, and so forth. Further, a reception box for storing specific received documents, such as confidential documents, can be provided in the HD 210 in association with an F code or a password (PWD) designated by a sender. For example, when image data with an F code or a PWD designated by a sender is received, the received image data is stored in a reception box associated with the F code or the PWD.

Figure 3:
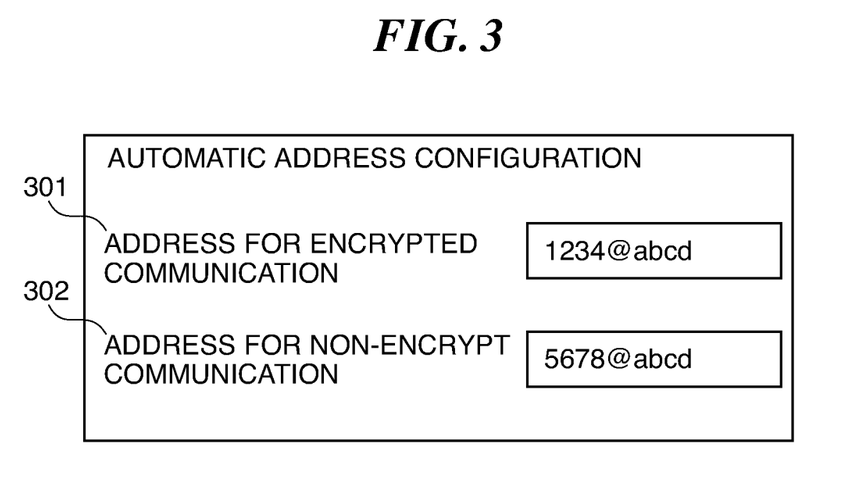
FIG. 3 is a view of an example of an address setting screen displayed on the digital multifunction machine (receiving end) appearing in FIG. 1.

Next, an address setting screen for setting the address (destination) of the digital multifunction machine 102 in the digital multifunction machine 102 when it is assumed that the digital multifunction machine 102 is at a receiving end will be described with reference to FIG. 3. FIG. 3 is a view of an example of the address setting screen displayed on the digital multifunction machine 102 (receiving end) appearing in FIG. 1.

Addresses assigned to the encrypted communication port and the non-encrypt communication port, respectively, can be changed using the address setting screen displayed on the operating display unit 203. In the address setting screen, it is possible to enter and set an encrypted communication address 301 to be assigned to the encrypted communication port and a non-encrypt communication address 302 to be assigned to the non-encrypt communication port, as shown in FIG. 3 by way of example. The operation for inputting and setting these addresses is carried out by the user, using the operating display unit 203. Further, these addresses are changed, as required, by the user. The set or changed encrypted communication address 301 and the set or changed non-encrypt communication address 302 are stored in the RAM of the system memory 206.

For facsimile communication, the user at a transmitting end inputs a receiving-end address and designates one of encrypted communication and non-encrypt communication. Then, an INVITE command containing a TO header describing the input receiving-end address is transmitted from the transmitting end to the receiving end.

When receiving the INVITE command, the receiving end determines whether the address described in the TO header of the INVITE command is an encrypted communication address or a non-encrypt communication address. If the address described in the TO header is an encrypted communication address, the receiving end sends the port number of the encrypted communication port to the transmitting end. On the other hand, if the address described in the TO header is a non-encrypt communication address, the receiving end sends the port number of the non-encrypt communication port to the transmitting end.

Figure 4:
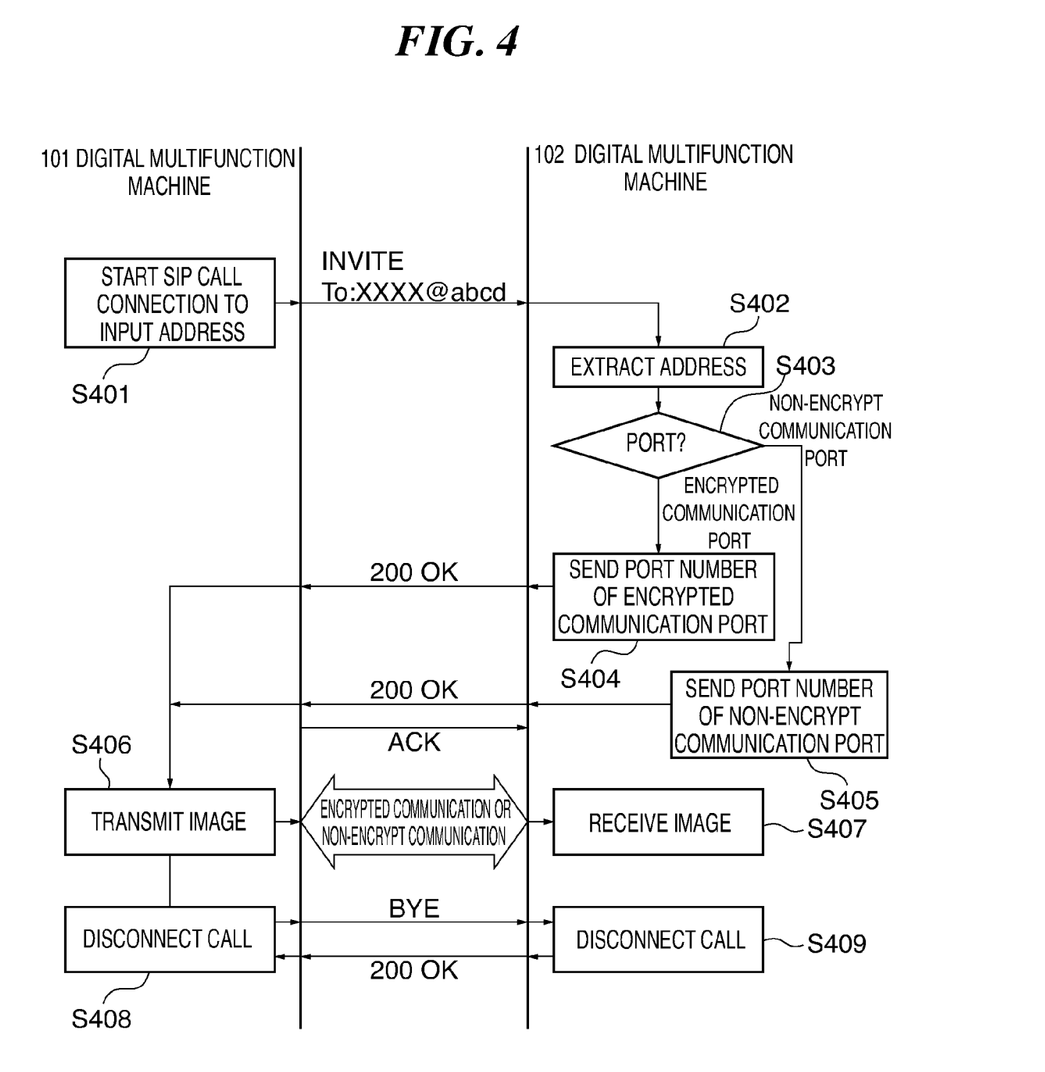
FIG. 4 is a flowchart of a transmission process executed for facsimile communication between the digital multifunction machines appearing in FIG. 1.

Next, operations performed for facsimile communication between the multifunction machine 101 as a transmitting end and the multifunction machine 102 as a receiving end will be described with reference to FIG. 4. FIG. 4 is a flowchart of a transmission process executed for facsimile communication between the digital multifunction machines 101 and 102 appearing in FIG. 1. The process shown in the flowchart in FIG. 4 is executed by the network controller 205 of each of the digital multifunction machines 101 and 102.

In the digital multifunction machine 101, the address of the destination is input and encrypted communication or non-encrypt communication is designated by the user. Then, an instruction for facsimile transmission is issued.

As shown in FIG. 4, in the digital multifunction machine 101, first, the network controller 205 starts a call connection using SIP (Session Initiation Protocol) (step S401). When the call connection is started, the INVITE command is sent from the network controller 205 to the destination. The INVITE command has a SIP header containing SIP URL information, a TO header, and a FROM header.

When the digital multifunction machine 102 receives the INVITE command from the digital multifunction machine 101, the network controller 205 of the digital multifunction machine 102 analyzes the SIP header of the INVITE command (step S402). In the step S402, an address described in the TO header is extracted. Then, the network controller 205 determines whether the extracted address is the encrypted communication address or the non-encrypt communication address set to the digital multifunction machine 102 (step S403). If the extracted address is the encrypted communication address, the network controller 205 sends an INVITE response containing the port number of the encrypted communication port to the digital multifunction machine 101 (step S404). On the other hand, if the extracted address is the non-encrypt communication address, the network controller 205 sends an INVITE response containing the port number of the non-encrypt communication port to the digital multifunction machine 101 (step S405).

When the digital multifunction machine 101 receives the response from the digital multifunction machine 102, the network controller 205 of the digital multifunction machine 101 establishes connection to the communication port assigned the port number contained in the response, and transmits IFP packets of image data (step S406).

If the port number is that of the encrypted communication port and encrypted communication is designated, the network controller 205 establishes connection to the encrypted communication port of the digital multifunction machine 102 and performs encrypted communication. More specifically, the IFP packets are encrypted by IPsec, and the encrypted IFP packets are transmitted. On the other hand, if the port number is that of the non-encrypt communication port and non-encrypt communication is designated, the network controller 205 establishes connection to the non-encrypt communication port of the digital multifunction machine 102 and transmits the IFP packets without encrypting these by IPsec.

The network controller 205 of the digital multifunction machine 102 receives the IFP packets sent from the digital multifunction machine 101, via the associated communication port (step S407).

When the encrypted IFP packets are received via the encrypted communication port, the network controller 205 decrypts the encrypted IFP packets into the original IFP packets and then converts the original IFP packets into image data. On the other hand, when the non-encrypt IFP packets (unencrypted IFP packets) are received via the non-encrypt communication port, the non-encrypt IFP packets are converted into image data.

When transmission of the image data is completed, the network controller 205 of the digital multifunction machine 101 performs call disconnection from the digital multifunction machine 102, using SIP (step S408) In response to this, the network controller 205 of the digital multifunction machine 102 also performs call disconnection (step S409).

Thus, encrypted communication or non-encrypt communication can be selectively performed according to the intention of a user. More specifically, when encrypted communication is desired, it is possible to reliably select encrypted communication by inputting the encrypted communication address, whereas when non-encrypt communication is desired, it is possible to reliably select non-encrypt communication by inputting the non-encrypt communication address.

Next, a description will be given of processing executed e.g. when an address input to the digital multifunction machine 101 (transmitting end) is the non-encrypt communication address set to the digital multifunction machine 102 (receiving end) and when encrypted communication is designated.

This can occur e.g. in the following cases:

(1) a case where the user at the transmitting end desires and designates encrypted communication, but erroneously or intentionally inputs the non-encrypt communication address set at the receiving end, and (2) a case where the encrypted communication address has been changed at the receiving end, and an address which the transmitting-end user who desires encrypted communication input as the encrypted communication address, unaware of the address change, is actually the non-encrypt communication address.

The case (1) or (2) corresponds to a case where the digital multifunction machine 101 (transmitting end) notified of the non-encrypt communication port by the digital multifunction machine 102 (receiving end) in response to a call connection establishes connection to the non-encrypt communication port and performs encrypted communication. However, since the non-encrypt communication port ignores encrypted IFP packets as described hereinabove, the digital multifunction machine 101 abandons encrypted communication with the digital multifunction machine 102 after having started the encrypted communication, and disconnects the call.

Further, a description will be given of processing executed when an address input to the digital multifunction machine 101 (transmitting end) is the encrypted communication address set to the digital multifunction machine 102 (receiving end) and when non-encrypt communication is designated.

This can occur e.g. in the following cases:

(3) a case where the user at the transmitting end desires and designates non-encrypt communication, but erroneously or intentionally inputs the encrypted communication address set at the receiving end, and (4) a case where the non-encrypt communication address has been changed at the receiving end, and an address which the transmitting-end user who desires non-encrypt communication input as the encrypted communication address, unaware of the address change, is actually the encrypted communication address.

The case (3) or (4) corresponds to a case where the digital multifunction machine 101 (transmitting end) notified of the encrypted communication port by the digital multifunction machine 102 (receiving end) in response to a call connection establishes connection to the encrypted communication port and performs non-encrypt communication. However, since the encrypted communication port ignores non-encrypt IFP packets as described hereinabove, the digital multifunction machine 101 abandons non-encrypt communication with the digital multifunction machine 102 after having started the non-encrypt communication, and disconnects the call.

Next, a description will be given of processing executed when a transmitting-end machine does not support encrypted communication and when a transmitting-end user inputs the encrypted communication address of a receiving-end machine, unaware that encrypted communication is not supported by the receiving-end machine.

This case corresponds to a case where the transmitting-end machine establishes connection to the encrypted communication port of the receiving-end machine to perform non-encrypt communication. More specifically, the transmitting-end machine notified of the encrypted communication port by the receiving-end machine in response to a call connection establishes connection to the encrypted communication port of the receiving-end machine and performs non-encrypt communication. However, since the encrypted communication port ignores non-encrypt IFP packets as described hereinabove, the transmitting-end machine abandons non-encrypt communication with the receiving-end machine and disconnects the call.

As described above, it is possible to prevent communication from being performed by a communication method against the intention of a user.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and function.

This application claims the benefit of Japanese Application No. 2007-029507, filed Feb. 8, 2007, which is hereby incorporated by reference herein in its entirety.

What is claimed is:

1. A receiving apparatus that performs call control in association with a transmitting apparatus, according to Session Initiation Protocol (SIP), the receiving apparatus comprising:
   a receiving unit configured to receive from the transmitting apparatus an INVITE command containing first destination information related to performing encrypted communication or second destination information related to performing non-encrypted communication;
   a determining unit configured to determine destination information contained in the received INVITE command; and
   a notification unit configured to notify the transmitting apparatus of a first port number for the encrypted communication when the destination information contained in the received INVITE command is the first destination information, and notify the transmitting apparatus of a second port number for the non-encrypted communication when the destination information contained in the received INVITE command is the second destination information,
   wherein the first destination information or the second destination information, whichever is contained in the received INVITE command, is described in a TO header of the received INVITE command,
   wherein the first destination information and the second destination information are different addresses for the receiving apparatus, and
   wherein the first port number and the second port number belong to the receiving apparatus.

2. A receiving apparatus as claimed in claim 1, further comprising a communication control unit configured to establish, after the port number has been notified by the notification unit, a connection with the transmitting apparatus corresponding to the notified port number.

3. A receiving apparatus as claimed in claim 1, further comprising a display unit configured to display a setting screen through which the first destination information or the second destination information is set by the user.

4. A control method of a receiving apparatus that performs call control in association with a transmitting apparatus, according to Session Initiation Protocol (SIP), the method comprising the steps of:
   receiving from the transmitting apparatus an INVITE command containing first destination information related to performing encrypted communication or second destination information related to performing non-encrypted communication;
   determining destination information contained in the received INVITE command; and
   notifying the transmitting apparatus of a first port number for the encrypted communication when the destination information contained in the received INVITE command is the first destination information, and notifying the transmitting apparatus of a second port number for the non-encrypted communication when the destination information contained in the received INVITE command is the second destination information,
   wherein the first destination information or the second destination information, whichever is contained in the received INVITE command, is described in a TO header of the received INVITE command,
   wherein the first destination information and the second destination information are different addresses for the receiving apparatus, and
   wherein the first port number and the second port number belong to the receiving apparatus.

* * * * *